US009372965B2

(12) United States Patent
Guffrey et al.

(10) Patent No.: US 9,372,965 B2
(45) Date of Patent: Jun. 21, 2016

(54) METHODS AND APPARATUS FOR DISPLAYING SIMULATED DIGITAL CONTENT

(71) Applicants: Erik Bargh Guffrey, Cary, NC (US); Grant Culver Fowler, Durham, NC (US); Igor Jablokov, Raleigh, NC (US)

(72) Inventors: Erik Bargh Guffrey, Cary, NC (US); Grant Culver Fowler, Durham, NC (US); Igor Jablokov, Raleigh, NC (US)

( * ) Notice: Subject to any disclaimer, the term of this patent is extended or adjusted under 35 U.S.C. 154(b) by 83 days.

(21) Appl. No.: 14/340,214

(22) Filed: Jul. 24, 2014

(65) Prior Publication Data

US 2015/0033366 A1 Jan. 29, 2015

Related U.S. Application Data

(60) Provisional application No. 61/857,832, filed on Jul. 24, 2013.

(51) Int. Cl.
*G06F 21/10* (2013.01)
*H04W 4/20* (2009.01)

(52) U.S. Cl.
CPC ............... *G06F 21/10* (2013.01); *H04W 4/206* (2013.01)

(58) Field of Classification Search
CPC ............................... G06F 21/10; H04W 4/206
See application file for complete search history.

(56) References Cited

U.S. PATENT DOCUMENTS

2003/0097408 A1* 5/2003 Kageyama .......... H04L 12/1818 709/205
2004/0003393 A1* 1/2004 Gutta ................. H04N 21/4223 725/25
2007/0033419 A1* 2/2007 Kocher ................... G06F 21/10 713/193
2007/0253065 A1* 11/2007 Doczy ................... G06F 1/1609 359/601
2009/0174658 A1* 7/2009 Blatchley .............. G06F 1/1601 345/158
2014/0078164 A1* 3/2014 Chan ........................ G09G 5/30 345/589

* cited by examiner

*Primary Examiner* — William Goodchild
(74) *Attorney, Agent, or Firm* — Danielson Legal LLC

(57) ABSTRACT

Systems, methods, and devices for displaying digital content. In one embodiment, a method of simulating digital content includes providing information corresponding to a plurality of pixels of displayable content at an electronic device; and simulating the displayable content at the electronic device by displaying a representation of a first subset of the plurality of pixels during a first time period and displaying a representation of a second subset of the plurality of pixels during a second time period.

14 Claims, 11 Drawing Sheets

TEXT BASED MESSAGING 610. user receives a text message alert 620. the message is delivered in randomized encrypted pieces 0.05 sec this is what a text message looks like to the user's eye while viewing 630. content snippets are then rapidly spliced on the display to fool the human eye 640. if the user attempts to screen-capture the message at any point, the resulting image is unreadable

TEXT BASED MESSAGING

METHODS AND APPARATUS FOR DISPLAYING SIMULATED DIGITAL CONTENT

CLAIM OF PRIORITY

The present application claims the benefit of U.S. Provisional Patent Application No. 61/857,832, filed Jul. 24, 2013, entitled Systems, Methods, and Devices for Displaying Simulated Digital Content and/or Displaying Digital Content Responsive to Satisfying a Viewing Condition, the disclosure of which is hereby incorporated herein in its entirety by reference.

FIELD

The present disclosure relates to systems, methods, and devices for displaying digital content.

BACKGROUND

When digital content, such as digital text, a digital image, and/or a digital video, is shared between two parties, or is otherwise accessible from an electronic device, the security and privacy of the content can be compromised in various ways. For example, the content may be accessed by an unintended recipient and/or an adversarial recipient. Additionally or alternatively, transmission of the content may be intercepted, or a breach of trust may occur with an intended recipient or with a hosted server. Moreover, a breach of security may occur with a hosted server or a displaying device.

Various electronic applications have attempted to increase the privacy of mildly-sensitive digital content and casual digital content (e.g., content that does not require a permanent record) by using ephemeral messages that are deleted in one form after a short period of time. Examples of ephemeral messaging include Snapchat, Inc.'s Snapchat application, Facebook, Inc.'s MessageMe and Poke applications, and Kismet's Blink application. Such applications may merely provide a cosmetic solution to privacy concerns, however, as it is possible to capture a permanent record of digital content by taking a screenshot of the content, and as it may be difficult to ensure permanent deletion of the content from an application server. For example, digital images may never be completely deleted from some ephemeral messaging servers.

Moreover, although Bump Technologies, Inc.'s Bump application may be used to enable proximity-based mobile-to-mobile connections, the Bump application may rely on a client-server model and may require recording of geo-location data to instantiate the connections. Such use of a client-server model, as well the recording of geo-location data, may reduce communications security and privacy.

One example of a secure messaging application is BlackBerry's BlackBerry Messenger (BBM). Although BBM is not an ephemeral solution, and although BBM has a strong legacy of messaging security within government and enterprise environments, BBM may have vulnerabilities with respect to unintended recipients, adversarial recipients, and breaches of trust with intended recipients.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present inventive concepts.

In one aspect, the present invention relates to a method of simulating digital content. The method includes providing information corresponding to a plurality of pixels of displayable content at an electronic device; and simulating the displayable content at the electronic device by displaying a representation of a first subset of the plurality of pixels during a first time period and displaying a representation of a second subset of the plurality of pixels during a second time period.

In one embodiment, the electronic device comprises a first electronic device and providing the information comprises transmitting the information from a second electronic device to the first electronic device. In one embodiment, the first and second electronic devices comprise first and second peer devices, respectively, in a peer-to-peer network and transmitting the information comprises transmitting the information from the second peer device to the first peer device. In another embodiment, the first and second electronic devices comprise client and server devices, respectively, in a client-server network and transmitting the information comprises transmitting the information from the server device to the client device. In another embodiment, transmitting the information from the second electronic device to the first electronic device comprises transmitting the information via an electronic message from the second electronic device to the first electronic device and simulating the displayable content comprises simulating the displayable content at the electronic device until reaching a time limit of the electronic message. In one embodiment, transmitting the information from the second electronic device to the first electronic device includes transmitting the information via an electronic message from the second electronic device to the first electronic device and the displayable content comprises text of the electronic message. In one embodiment, the displayable content includes a photo comprising the plurality of pixels.

In one embodiment, providing the information comprises generating the information at the electronic device without using a network connection. In another embodiment, the first and second subsets of the plurality of pixels comprise first and second pseudorandom subsets, respectively, of the plurality of pixels, displaying the representation of the first subset of the plurality of pixels comprises displaying a representation of the first pseudorandom subset of the plurality of pixels during the first time period and displaying the representation of the second subset of the plurality of pixels comprises displaying a representation of the second pseudorandom subset of the plurality of pixels during the second time period.

In one embodiment, simulating the displayable content comprises simulating the displayable content at the electronic device only as long as one or more viewing conditions are met with respect to the electronic device. In one embodiment, that method further includes measuring the one or more viewing conditions using a sensor of the electronic device. In one embodiment, measuring the one or more viewing conditions comprises measuring the one or more viewing conditions using a camera, a light sensor, a position sensor, and/or a motion sensor of the electronic device. In one embodiment, the one or more viewing conditions comprise a verification of a security key of the electronic device. In another embodiment, that method further includes determining that a display screen of the electronic device is unlikely to be visible to a third party in response to a determination that the one or more viewing conditions are met with respect to the electronic device.

In one embodiment, the method further includes determining whether a physical privacy screen is used with the electronic device, wherein simulating the displayable content at the electronic device includes providing a first simulation of the displayable content in response to determining that the physical privacy screen is used with the electronic device or providing a second simulation of the displayable content in response to determining that the physical privacy screen is absent from the electronic device.

In another embodiment, the present invention includes a computer program product having a non-transitory computer readable storage medium including computer readable program code therein configured to provide information corresponding to a plurality of pixels of displayable content at an electronic device; and simulate the displayable content at the electronic device by displaying a representation of a first subset of the plurality of pixels during a first time period and displaying a representation of a second subset of the plurality of pixels during a second time period.

In another aspect, the present invention relates to a method of simulating digital content. The method includes providing information corresponding to displayable content at an electronic device and simulating, using the information, the displayable content at the electronic device by displaying a representation of a first portion of the displayable content during a first time period and displaying a representation of a second portion of the displayable content during a second time period.

In one embodiment, the electronic device comprises a first electronic device and providing the information comprises transmitting the information from a second electronic device to the first electronic device. In one embodiment, the first and second electronic devices comprise first and second peer devices, respectively, in a peer-to-peer network and transmitting the information comprises transmitting the information from the second peer device to the first peer device. In another embodiment, the first and second electronic devices comprise client and server devices, respectively, in a client-server network and transmitting the information comprises transmitting the information from the server device to the client device. In another embodiment, transmitting the information from the second electronic device to the first electronic device comprises transmitting the information via an electronic message from the second electronic device to the first electronic device and simulating the displayable content comprises simulating the displayable content at the electronic device until reaching a time limit of the electronic message.

In one embodiment, providing the information comprises generating the information at the electronic device without using a network connection. In another embodiment, the first and second subsets of the plurality of pixels comprise first and second pseudorandom subsets, respectively, of the plurality of pixels, displaying the representation of the first subset of the plurality of pixels comprises displaying a representation of the first pseudorandom subset of the plurality of pixels during the first time period and displaying the representation of the second subset of the plurality of pixels comprises displaying a representation of the second pseudorandom subset of the plurality of pixels during the second time period. In one embodiment the displayable content includes a photo comprising the plurality of pixels.

In one embodiment, the method further includes determining whether a display screen of the electronic device is unlikely to be visible to a third party and simulating the displayable content includes simulating the displayable content at the electronic device responsive to determining that the display screen of the electronic device is unlikely to be visible to the third party. In one embodiment, that method further includes continuing to determine whether the display screen of the electronic device is unlikely to be visible to the third party after beginning simulating the displayable content at the electronic device and discontinuing simulating the displayable content at the electronic device in response to determining that the display screen of the electronic device is not unlikely to be visible to the third party.

In one embodiment, the determination that the display screen of the electronic device is unlikely to be visible to the third party includes a determination that one or more viewing conditions are met with respect to the electronic device. In another embodiment, that method further includes measuring the one or more viewing conditions using a sensor of the electronic device. In one embodiment, measuring the one or more viewing conditions includes measuring the one or more viewing conditions using a camera, a light sensor, a position sensor, and/or a motion sensor of the electronic device. In one embodiment, the one or more viewing conditions include a verification of a security key of the electronic device.

In one embodiment, transmitting the information from the second electronic device to the first electronic device includes transmitting the information via an electronic message from the second electronic device to the first electronic device and the displayable content includes text of the electronic message. In another embodiment, the method further includes determining whether a physical privacy screen is used with the electronic device, and simulating the displayable content at the electronic device includes providing a first simulation of the displayable content in response to determining that the physical privacy screen is used with the electronic device or providing a second simulation of the displayable content in response to determining that the physical privacy screen is absent from the electronic device. In still another embodiment, the present invention includes a computer program product having a non-transitory computer readable storage medium including computer readable program code therein configured to provide information corresponding to displayable content at an electronic device and simulating, using the information, the displayable content at the electronic device by displaying a representation of a first portion of the displayable content during a first timer period and displaying a representation of a second portion of the displayable content during a second time period.

In yet another aspect, the present invention relates to a method of providing digital content. The method includes providing information corresponding to displayable content at an electronic device, determining whether one or more viewing conditions are met with respect to the electronic device and displaying the displayable content at the electronic device in response to determining that the one or more viewing conditions are met with respect to the electronic device.

In one embodiment, the method further includes continuing to determine whether the one or more viewing conditions are met after beginning displaying the displayable content at the electronic device and discontinuing displaying the displayable content at the electronic device in response to determining that the one or more viewing conditions are no longer met with respect to the electronic device. In one embodiment, the one or more viewing conditions include a verification of a security key of the electronic device.

In another embodiment, the method further includes measuring the one or more viewing conditions using a sensor of the electronic device. In one embodiment, measuring the one or more viewing conditions includes measuring the one or more viewing conditions using a camera, a light sensor, a position sensor, and/or a motion sensor of the electronic device.

In still another embodiment, the method further includes determining that a display screen of the electronic device is unlikely to visible to a third party in response to determining that the one or more viewing conditions are met with respect to the electronic device and displaying the displayable content includes displaying the displayable content at the electronic device in response to determining that the display screen of the electronic device is unlikely to be visible to the third party.

In yet another embodiment, the method further includes decrypting the information before displaying the displayable content in response to determining that the one or more viewing conditions are met with respect to the electronic device. In one embodiment, providing the information corresponding to the displayable content includes providing the information corresponding to the displayable content along with information regarding the one or more viewing conditions. In one embodiment, determining whether the one or more viewing conditions are met with respect to the electronic device includes using the information regarding the one or more viewing conditions when determining whether the one or more viewing conditions are met with respect to the electronic device.

In one embodiment, the electronic device includes a first electronic device and providing the information includes transmitting the information from a second electronic device to the first electronic device. In one embodiment, the first and second electronic devices include first and second peer devices, respectively, in a peer-to-peer network and transmitting the information includes transmitting the information from the second peer device to the first peer device. In another embodiment, the first and second electronic devices include client and server devices, respectively, in a client-server network and transmitting the information includes transmitting the information from the server device to the client device.

In one embodiment, providing the information includes generating the information at the electronic device without using a network connection. In another embodiment, determining whether the one or more viewing conditions are met with respect to the electronic device includes determining whether a physical privacy screen is used with the electronic device.

It is noted that aspects of the present inventive concepts described with respect to one embodiment may be incorporated in a different embodiment although not specifically described relative thereto. That is, all embodiments and/or features of any embodiment can be combined in any way and/or combination. Applicants reserve the right to change any originally filed claim or file any new claim accordingly, including the right to be able to amend any originally filed claim to depend from and/or incorporate any feature of any other claim although not originally claimed in that manner. These and other objects and/or aspects of the present inventive concepts are explained in detail below.

BRIEF DESCRIPTION OF THE DRAWINGS

The accompanying drawings, which form a part of the specification, illustrate various embodiments of the present inventive concepts. The drawings and description together serve to fully explain embodiments of the present inventive concepts, in which.

In the drawings, like reference characters generally refer to corresponding parts throughout the different views. The drawings are not necessarily to scale, emphasis instead being placed on the principles and concepts of operation.

DETAILED DESCRIPTION

Figure 1A:
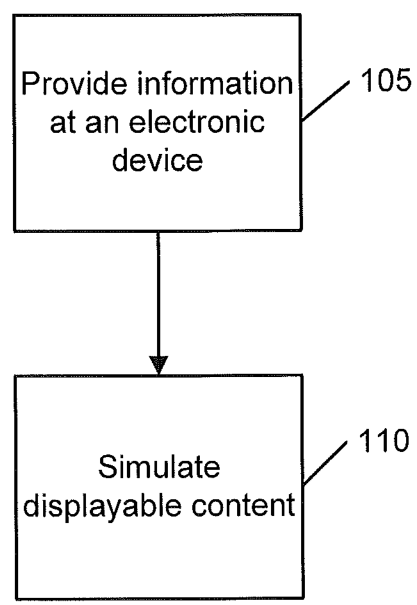
FIG. 1A is a flowchart of a method of simulating digital content in accord with the present invention.

Example embodiments of the inventive concepts now will be described with reference to the accompanying drawings. The inventive concepts may, however, be embodied in a variety of different forms and should not be construed as limited to the embodiments set forth herein. Rather, these embodiments are provided so that this disclosure will be thorough and complete, and will fully convey the scope of the inventive concepts to those skilled in the art. In the drawings, like designations refer to like elements. It will be understood that when an element is referred to as being "connected," "coupled," or "responsive" to another element, it can be directly connected, coupled or responsive to the other element or intervening elements may be present. Furthermore, "connected," "coupled," or "responsive" as used herein may include wirelessly connected, coupled or responsive.

The terminology used herein is for the purpose of describing particular embodiments only and is not intended to be limiting of the inventive concepts. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. The symbol "/" is also used as a shorthand notation for "and/or."

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will also be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of the inventive concepts.

Example embodiments of the inventive concepts may be embodied as systems, methods, and devices. Accordingly, example embodiments of the inventive concepts may be embodied in hardware and/or in software (including firmware, resident software, micro-code, etc.). Furthermore, example embodiments of the inventive concepts may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of the inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Various embodiments of the inventive concepts described herein address privacy and security concerns within the context of digital content delivery applications. Accordingly, although many electronic applications may suffer from privacy vulnerabilities, various embodiments of the inventive concepts herein may address such vulnerabilities. For example, some embodiments may address privacy vulnerabilities by simulating an original representation of displayed content without actually serving the content to an electronic device's display. Moreover, some embodiments may further address privacy vulnerabilities by using encryption techniques and/or other security technologies.

Figure 1B:
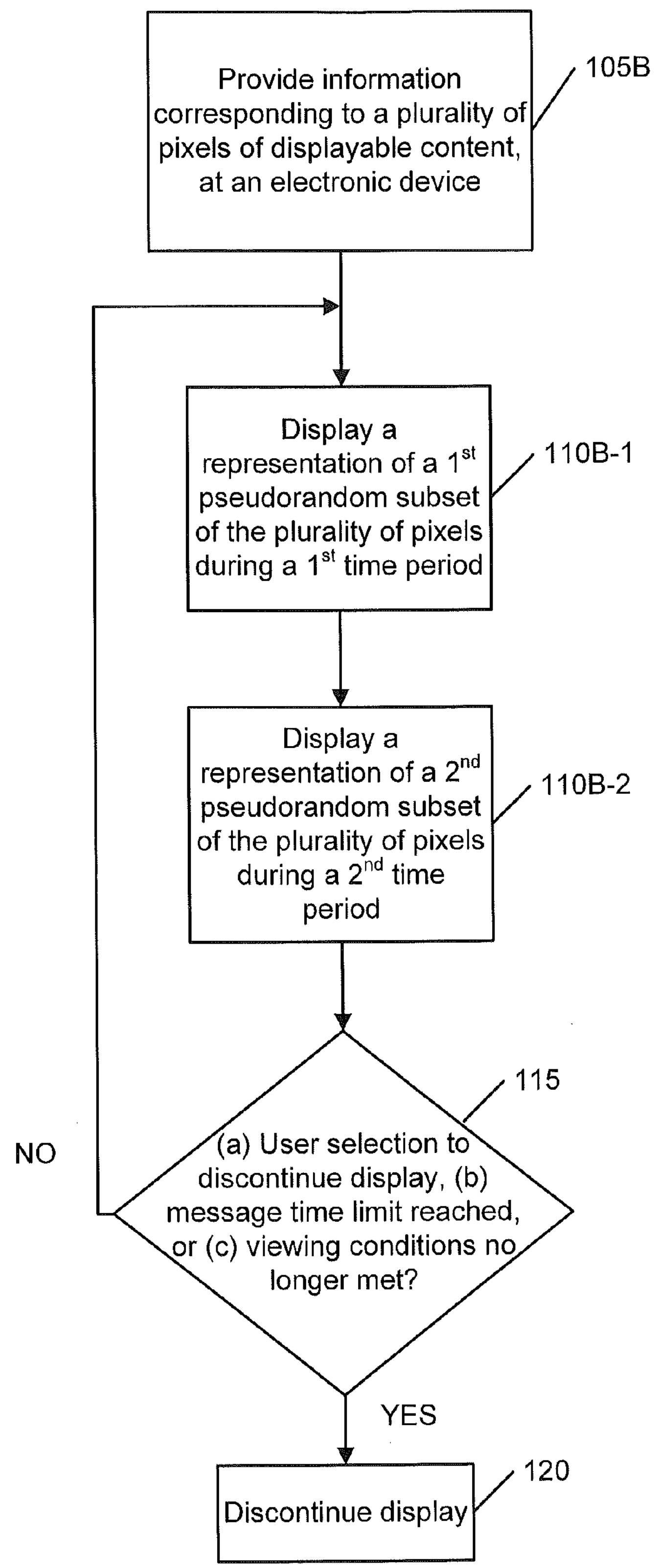
FIG. 1B is a flowchart of another method of simulating digital content in accord with the present invention.

Referring now to FIGS. 1A and 1B, flowcharts are provided illustrating operations of simulating displayable digital content, according to various embodiments of the inventive concepts. Referring to FIG. 1A, information may be provided at a user's electronic device (Block 105) and may be used to simulate displayable content (Block 110). For example, the information may represent content that is stored and/or displayed at an electronic device other than the user's electronic device. As an example, the information may represent a digital photo, video, email message, text message (e.g., a Short Message Service (SMS) or Multimedia Messaging Service (MMS) message), website, or any other visual content that can be displayed using an electronic device.

In one example, the information may be electronic (e.g., digital) information transmitted from a server or another electronic device to the user's electronic device via a wired communications network and/or a wireless communications network. In various embodiments, the information may be transmitted to the user's electronic device exclusively via peer-to-peer messaging rather than using a client-server model. In particular, intermediate peers may be used to relay the information from an originating electronic device to the user's electronic device, and the message may be secured such that the intermediate peers cannot read the message that they are relaying. By using peer-to-peer messaging rather than a client-server model, various embodiments of the inventive concepts may reduce/prevent the storage of sensitive digital content on a server, thus further increasing the security of the digital content.

In another example, providing the information at the user's electronic device at Block 105 may include generating the information at the user's electronic device, rather than receiving the information via a communications network. For example, software within the user's electronic device may generate the information, and the software may not require a network connection.

It will be understood that the information may be provided at the user's electronic device in Block 105 in either an encrypted or unencrypted form. Additionally or alternatively, noise may be added to the information to enhance security.

Referring to Block 110 of FIG. 1A, simulating the displayable content may include, in one example, displaying (using the information provided in Block 105) a simulation at the user's electronic device of the content that is stored and/or displayed at an electronic device transmitting the information to the user's electronic device. In another example, simulating the displayable content may include simulating (using the information provided in Block 105) visual content that may be generated by the user's electronic device without using a network connection, rather than actually displaying the visual content itself. Accordingly, the operations of FIG. 1A may be performed by various types of electronic applications, including network-based applications and native software applications. Moreover, by using the operations of FIG. 1A, rather than displaying a digital photo (or other displayable content) that is provided at the user's electronic device, the user's electronic device may simulate a visual representation of the digital photo, thus enhancing the security of the digital photo.

According to various embodiments of the inventive concepts, simulating the displayable content at Block 110 may include displaying a plurality of electronic representations of portions of the displayable content at a modified/high frequency. Such simulations may be referred to as "chaotic frequency modulation" (although it will be understood that the simulations described herein are not limited thereto). For example, rather than displaying a digital photo, the user's electronic device may display a plurality of electronic representations of portions of the digital photo during different time periods, at a modified/high frequency, to simulate a still/static and comprehensive representation of the digital photo. Accordingly, various embodiments of the inventive concepts may provide simulations that appear to the human eye like comprehensive representations of displayable content, but that cannot be captured/stored as comprehensive displayable content (e.g., a complete photo or a complete message). By reducing/preventing storage of comprehensive displayable content, security of the displayable content may be enhanced.

For example, referring to FIG. 1B, information provided at a user's electronic device may be information corresponding to a plurality of pixels of displayable content (Block 105B). As an example, the displayable content may be a digital photo that includes a plurality of pixels, of which there may be a plurality of subsets. A representation of a first subset of the plurality of pixels may be displayed by the user's electronic device during a first time period (Block 110B-1). Moreover, a representation of a second subset of the plurality of pixels, which second subset includes at least some pixels not included in the first subset, and vice versa, may be displayed by the user's electronic device during a second (e.g., subsequent) time period (Block 110B-2). The first and second subsets of the plurality of pixels may individually be incoherent with respect to understanding the comprehensive displayable content. Accordingly, by simulating displayable content as illustrated in FIG. 1B, various embodiments of the inventive concepts may protect against storage of the comprehensive displayable content by the user's electronic device, and may also protect against obtaining the comprehensive displayable content by hacking into hardware (e.g., video hardware) of the user's electronic device.

Referring still to Blocks 110B-1 and 110B-2 of FIG. 1B, the representations of the first and second subsets of the plurality of pixels may be pseudorandom. As a result, second and subsequent iterations/cycles of the Blocks 110B-1 and 110B-2 may use different first and second subsets of the plurality of pixels. In other words, the subset of pixels used in the first subset may change in different iterations/cycles of Block 110B-1, and/or the subset of pixels used in the second subset may change in different iterations/cycles of Block 110B-2.

Moreover, although only two representations of subsets of pixels are indicated in FIG. 1B, it will be understood that three, four, or more representations of subsets of pixels may be used to simulate the displayable content. Accordingly, the operations of FIG. 1B may include three, four, or more operations of displaying representations of subsets of pixels and three, four, or more respective time periods.

The user's electronic device may continue to display representations of subsets of pixels (e.g., to cycle through Blocks 110B-1 and 110B-2) until (a) the user of the electronic device makes a selection (e.g., via an external switch/button or a graphical user interface of the user's electronic device) to discontinue such display, (b) a message time limit is reached (if the information provided in Block 105B is communicated via a message), or (c) one or more viewing conditions of the user's electronic device are no longer met (Blocks 115 and 120). Viewing conditions may include (i) time of day, (ii) angle at which the user's electronic device is oriented, (iii) geographic location of the user's electronic device, (iv) ambient light, (v) sudden movement of the user's electronic device, (vi) whether the user's electronic device is lying (e.g., lying flat) on an object or is being held by a person, and/or (vii) whether the user's electronic device has the same key as a sender of the digital information.

Figure 1C:
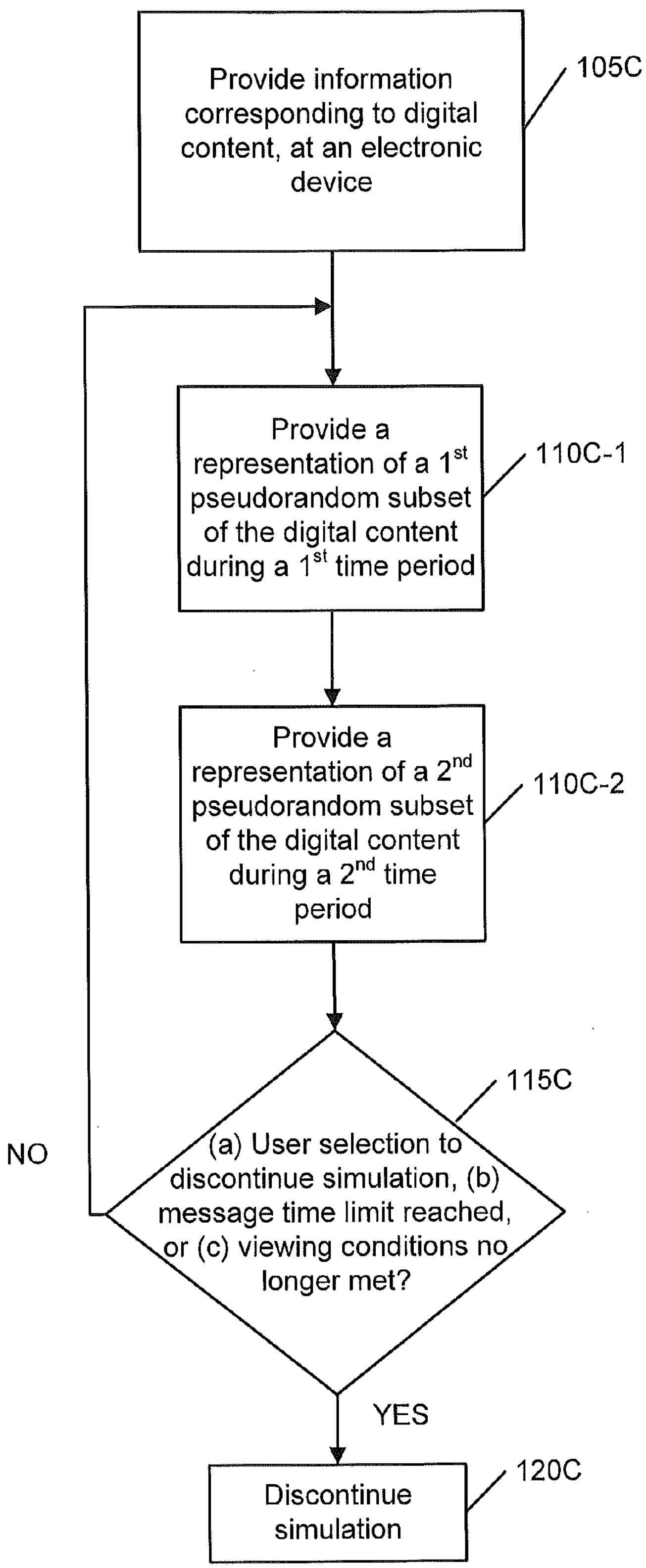
FIG. 1C is a flowchart illustrating operations of simulating digital content according to various embodiments of the inventive concepts.

Referring to FIG. 1C, a flowchart is provided illustrating operations of simulating digital content, according to various embodiments of the inventive concepts. In particular, Blocks 105C-120C of FIG. 1C illustrate that operations of simulating content are not limited to displaying representations of pixels. Rather, the digital content that is simulated using the operations of FIG. 1C may include various types of visual (e.g., displayable) digital content. Accordingly, the first and second pseudorandom subsets of digital content, for which representations are provided in Blocks 110C-1 and 110C-2 of FIG. 1C, may be first and second pseudorandom subsets of digital text, subsets of a digital photo, subsets of a digital video, etc.

Figure 2A:
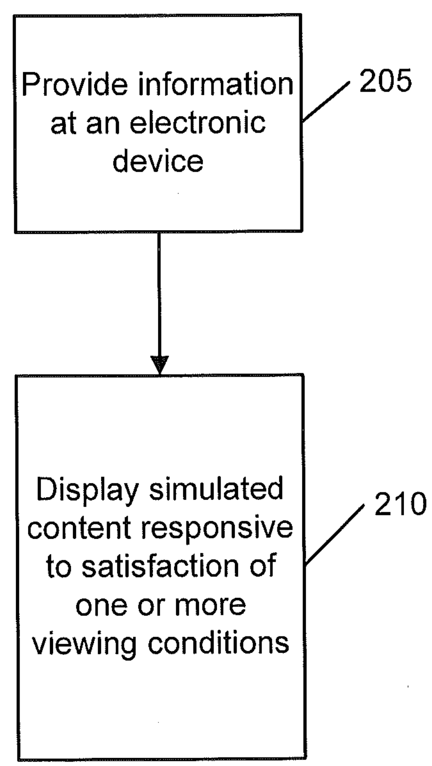
FIG. 2A is a flowchart illustrating a method of displaying simulated digital content in response to satisfying one or more viewing conditions of a user's electronic device according to various embodiments of the inventive concepts.
Figure 2B:
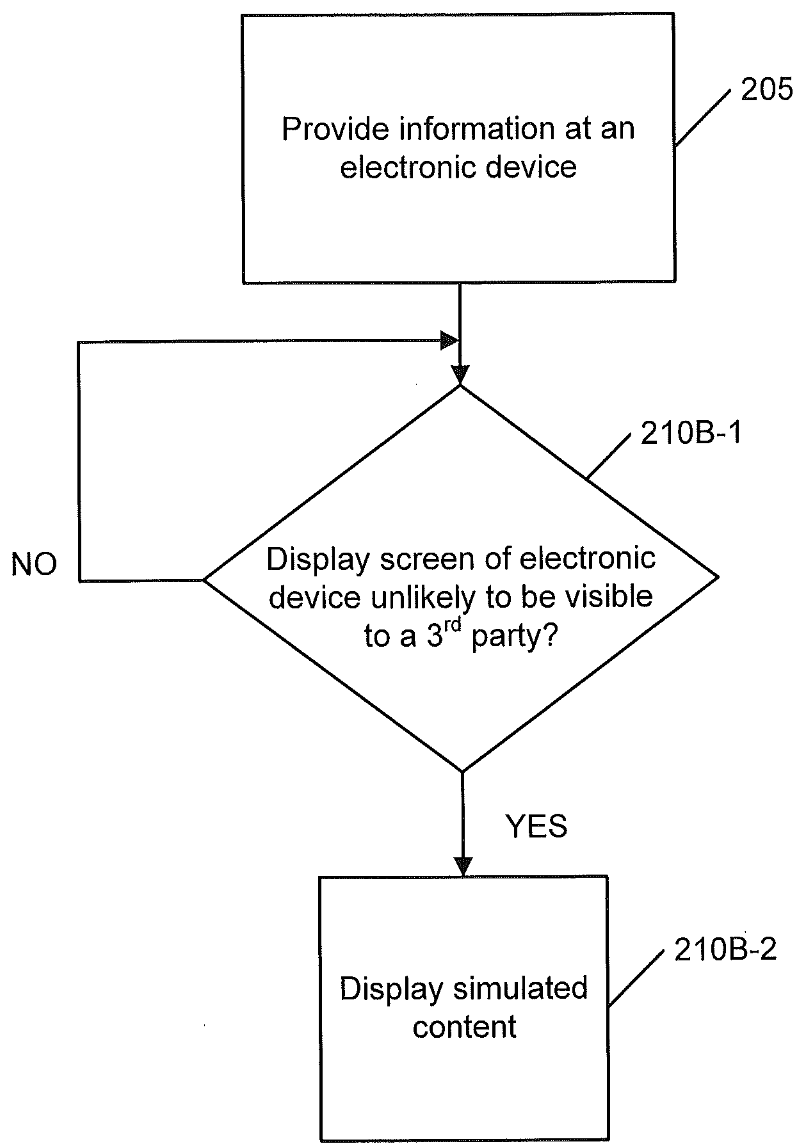
FIG. 2B is a flowchart illustrating another method of displaying simulated digital content in response to satisfying one or more viewing conditions of a user's electronic device according to various embodiments of the inventive concepts.

Referring now to FIGS. 2A and 2B, flowcharts are provided illustrating operations of displaying simulated digital content in response to satisfying one or more viewing conditions of a user's electronic device, according to various embodiments of the inventive concepts. Referring to FIG. 2A, upon providing digital information at the user's electronic device (Block 205), the user's electronic device may display simulated digital content in response to satisfying one or more viewing conditions of the user's electronic device (Block 210). It will be understood that the information provided in Block 205 may be the information described herein regarding Blocks 105, 105B, or 105C of FIGS. 1A-1C, respectively.

Moreover, referring again to Block 210 of FIG. 2A, in some embodiments, a confidence level may be calculated based on an analysis of one or more viewing conditions for the user's electronic device. For example, receipt/decryption of information (e.g., the digital information provided in Block 205) at the user's electronic device may be conditioned upon a threshold confidence level with respect to a likelihood that the display screen of the user's electronic device is not visible to a third party.

Referring to FIG. 2B, Blocks 210B-1 and 210B-2 illustrate an example in which the user's electronic device only displays simulated digital content if the display screen of the user's electronic device is unlikely to be visible to a third party. A determination that the display screen of the user's electronic device is unlikely to be visible to a third party may be based on one or more viewing conditions. For example, it may be determined that the display screen of the user's electronic device is unlikely to be visible to a third party if fingerprint technology and/or facial-recognition technology of the user's electronic device verifies that an authorized user of the electronic device is currently using the electronic device. In another example, it may be determined that the display screen of the user's electronic device is unlikely to be visible to a third party if a camera or other sensor of the user's electronic device indicates that the face of an authorized user of the electronic device is currently covering substantially the entire display screen of the electronic device.

The determination as to whether the display screen of the user's electronic device is unlikely to be visible to a third party may be made before and/or after beginning Block 210B-2's display of simulated content at the user's electronic device. For example, the display of simulated content (Block 210B-2) may be responsive to determining (Block 210B-1) that the display screen of the user's electronic device is unlikely to be visible to a third party. In some embodiments, operations of determining (Block 210B-1) whether the display screen of the user's electronic device is unlikely to be visible to the third party may continue after beginning displaying the simulated content (Block 210B-2)(i.e., after beginning simulating the displayable content) at the user's electronic device. Moreover, the user's electronic device may discontinue simulating the displayable content at the user's electronic device in response to determining that the display screen of the user's electronic device is not unlikely to be visible to the third party. Furthermore, it will be understood that Block 210B-2 of FIG. 2B may include the operations of Blocks 110B-1 through 120 of FIG. 1B.

Furthermore, it will be understood that although viewing conditions may be used to determine a likelihood that a display screen of a user's electronic device is visible to a third party, viewing conditions are not limited to such determinations. Rather, viewing conditions may be used for numerous other reasons, including the safety and/or convenience/preferences of the user (and/or owner of the device), among other reasons.

The operations illustrated in FIGS. 1A, 1B, 2A, and 2B may protect against instances of reproducing displayable content by taking a screenshot of a user's electronic device, because taking a screenshot of a simulation of the displayable content will only reproduce a portion of the displayable content. For example, taking a screenshot of the simulation of the displayable content may only reproduce a portion of the displayable content that is momentarily displayed at the user's electronic device between the display of other portions of the displayable content, and such a screenshot therefore may not provide a comprehensive reproduction of the displayable content.

Various embodiments of the inventive concepts may additionally or alternatively enhance security of displayable content by requiring satisfaction of one or more viewing conditions before and/or while simulating the displayable content. Moreover, security may be enhanced by using encryption and/or by using peer-to-peer messaging rather than client-server models.

It will be understood that although viewing conditions may be implemented in combination with the display of simulated content in some embodiments, viewing conditions and simulated content may also be separate/independent implementations. In other words, operations described herein with respect to viewing conditions may be performed separately/independently from operations described herein with respect to displaying simulated content, and vice versa.

For example, operations in the flowcharts of FIGS. 1A and 1B may be performed irrespective of whether viewing conditions are satisfied. Moreover, operations described herein with respect to viewing conditions may be performed to deliver/display either simulated or unsimulated content.

Figure 3:
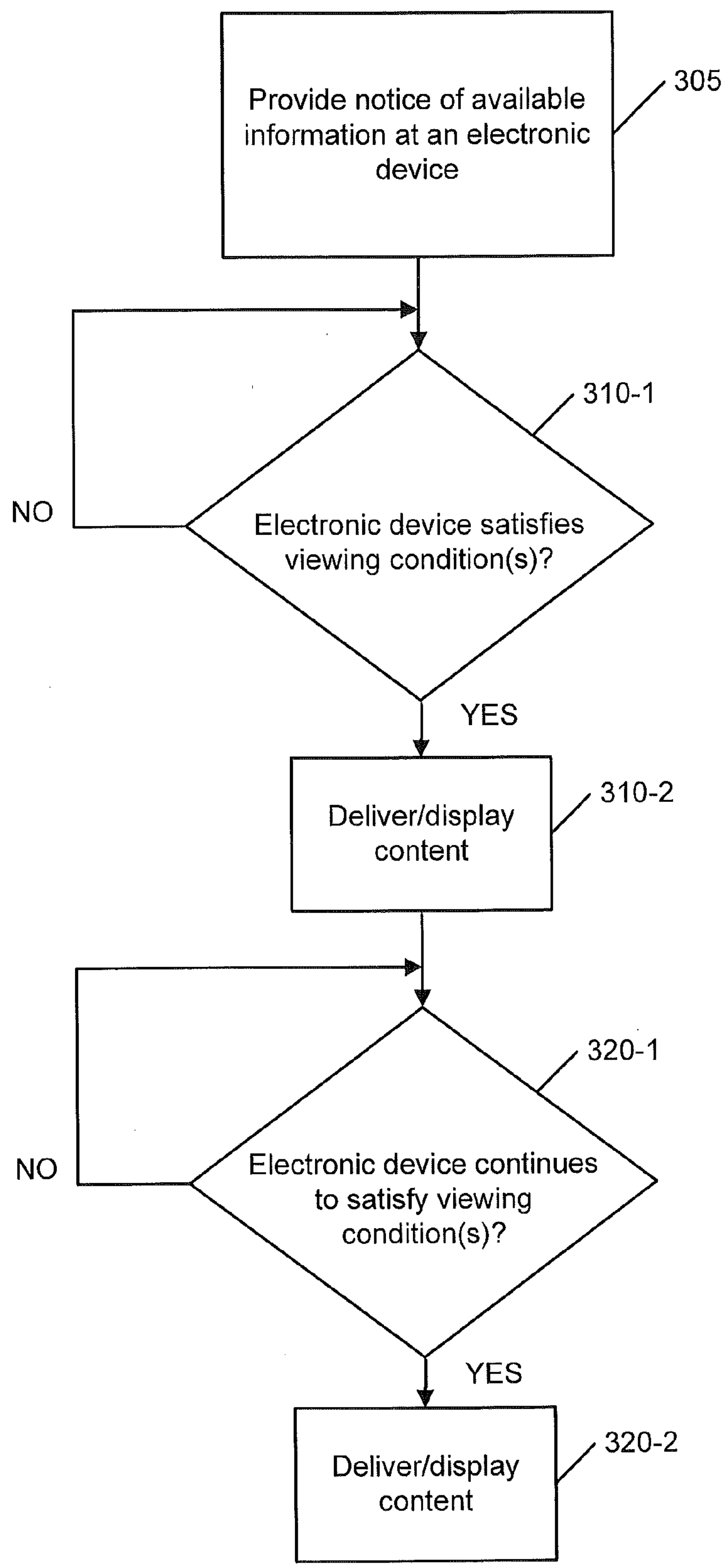
FIG. 3 is a flowchart illustrating operations of delivering/displaying digital content in response to satisfying one or more viewing conditions of a user's electronic device according to various embodiments of the inventive concepts.

As an example, referring now to FIG. 3, a flowchart is provided illustrating operations of delivering/displaying digital content in response to satisfying one or more viewing conditions of a user's electronic device, according to various embodiments of the inventive concepts. Referring to FIG. 3, notice (e.g., notification) that information (e.g., digital content) is available may be provided at the user's electronic device (Block 305). For example, a vibration, ringtone, display screen illumination, blinking light, image, text, or other audio and/or visual indication may provide the notice. Moreover, the notice may be provided with or without information about one or more viewing conditions that must be satisfied to deliver/display the digital content. The user's electronic device may use the information about the one or more viewing conditions to determine whether the one or more viewing conditions have been satisfied.

Referring still to FIG. 3, the user's electronic device may then deliver digital content in response to determining that one or more viewing conditions are satisfied (Blocks 310-1 and 310-2). For example, the user's electronic device may display (at Block 310-2) an unsimulated digital image that is included in an electronic message received at the user's electronic device. The one or more viewing conditions may include, but are not limited to, time of day, date, geo-location, day of week, detection of indoor light versus outdoor light, connected network(s), firewall(s), facial recognition, presence/absence of infrared light, touch event(s), audio event(s), connected peripheral(s), proximity, orientation, velocity, and humidity, among others, and may be determined/detected by the user's electronic device. In some embodiments, delivery of the digital content (at Block 310-2) may include receipt/decryption of the information/digital content.

Moreover, the user's electronic device may continue to deliver/display the digital content only as long as the one or more viewing conditions are satisfied (Blocks 320-1 and 320-2). The digital content delivered/displayed in Blocks 310-2 and/or 320-2 may be either encrypted or unencrypted. Also, as described herein, the digital content may be either be simulated (e.g., using operations illustrated in FIGS. 1A-2B and 4-7) or unsimulated.

In some embodiments, operations described herein may be used in combination with a physical privacy screen (e.g., a physical privacy filter/shield). Such a physical privacy screen may be a physical material on a display screen of an electronic device. For example, the physical privacy screen may be a removable (e.g., attachable/detachable) physical privacy screen. The physical privacy screen may help to reduce/prevent capture by an external recording device of images/text displayed by the display screen of the electronic device. As an example, the physical privacy screen may reduce/prevent screen capture by an external still-image/video recording device.

The physical privacy screen may be used in combination with operations of any of FIGS. 1A-7. For example, the operations of FIG. 1A may include determining whether a physical privacy screen is used with the electronic device, and simulating (Block 110) the displayable content at the electronic device may include providing a first simulation of the displayable content in response to determining that the physical privacy screen is used with the electronic device, or providing a second simulation of the displayable content in response to determining that the physical privacy screen is absent from the electronic device. Accordingly, operations of simulating (Block 110) the displayable content may vary in response to whether the physical privacy screen is used with (e.g., is on) the electronic device. For example, the frequency with which the representations in Blocks 110B-1, 110B-2, 110C-1, and 110C-2 of FIGS. 1B and 1C are displayed may increase or decrease, depending on whether the physical privacy screen is used.

Additionally or alternatively, the physical privacy screen may be combined with operations of determining whether viewing conditions are met. For example, referring to FIG. 3, determining (Block 310-1) whether one or more viewing conditions are met with respect to the electronic device may include determining whether a physical privacy screen is used with the electronic device. In particular, in some embodiments, delivery/display (Block 310-2) of content may require the presence of the physical privacy screen. Moreover, it will be understood that the presence of the physical privacy screen may be determined using a sensor of the electronic device, or may be determined based on a setting of an electronic application used by a user of the electronic device (e.g., a user may indicate via a graphical user interface that a physical privacy screen is on the electronic device).

Operations of determining whether viewing conditions are met may be performed using one or more sensor devices of an electronic device. The nature of such sensors will typically vary in accordance with the viewing conditions at issue. For example, a Global Positioning System (GPS) device may determine the geo-location of a user of the electronic device. Additionally or alternatively, a gyroscope or other motion sensor may detect movement and/or orientation of the electronic device. Accordingly, a GPS device and/or a gyroscope may be used to determine a position of the electronic device when the viewing conditions at issue are based on position, motion, orientation, etc.

When the viewing conditions are biological, biometric sensors may be employed. For example, a viewing condition requiring that the device be operated by a living person may be met using a cardiometer. A viewing condition requiring that the operator not be in a state of duress could be met by a blood pressure sensor or a sensor measuring the conductivity of the operator's body. A viewing condition requiring that the device's operator be a particular individual could be met using a fingerprint reader, etc.

Figure 4:
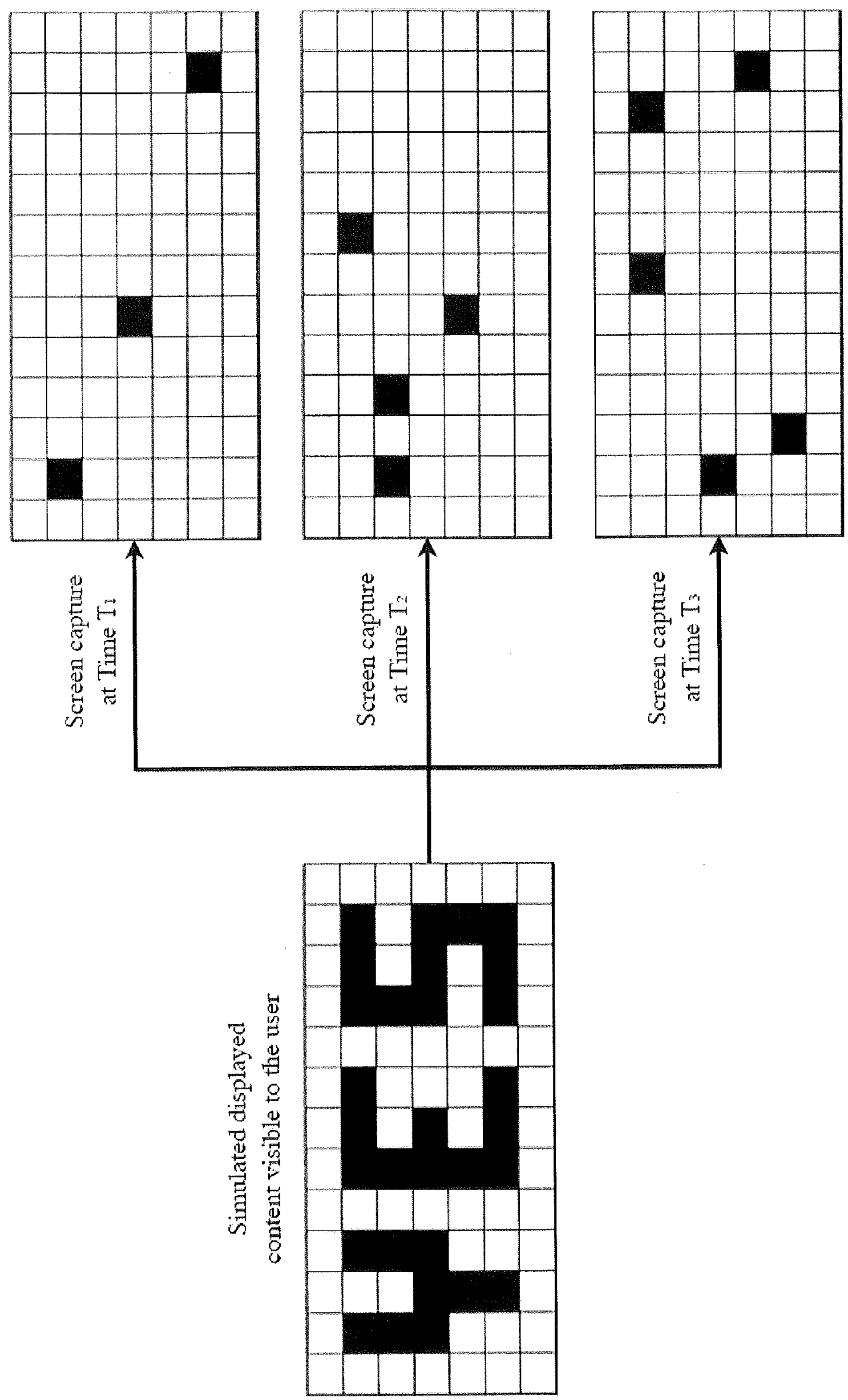
FIG. 4 is a diagram illustrating subsets of pixels that are displayed during different time periods T1-T3 at a user's electronic device.

Referring now to FIG. 4, a diagram is provided illustrating subsets of pixels that are displayed during different time periods T1-T3 at a user's electronic device. For example, it will be understood that the first and second subsets of pixels corresponding to the first and second time periods T1 and T2 illustrated in FIG. 4 may be displayed according to the operations in Blocks 110B-1 and 110B-2 of the flowchart in FIG. 1B. In particular, FIG. 4 illustrates that by displaying the first through third subsets of pixels during different time periods T1-T3 (as well as any additional subsets of pixels, during respective additional time periods, that may be necessary to provide the entire plurality of pixels illustrating an image that spells out the word "YES"), a user will see the word "YES," whereas a screenshot of the user's electronic device at any particular moment (e.g., the time T2) will capture only a subset of the pixels. Accordingly, FIG. 4 provides an example of how simulating digital content according to various operations described herein can protect digital content from screenshots.

Figure 5:
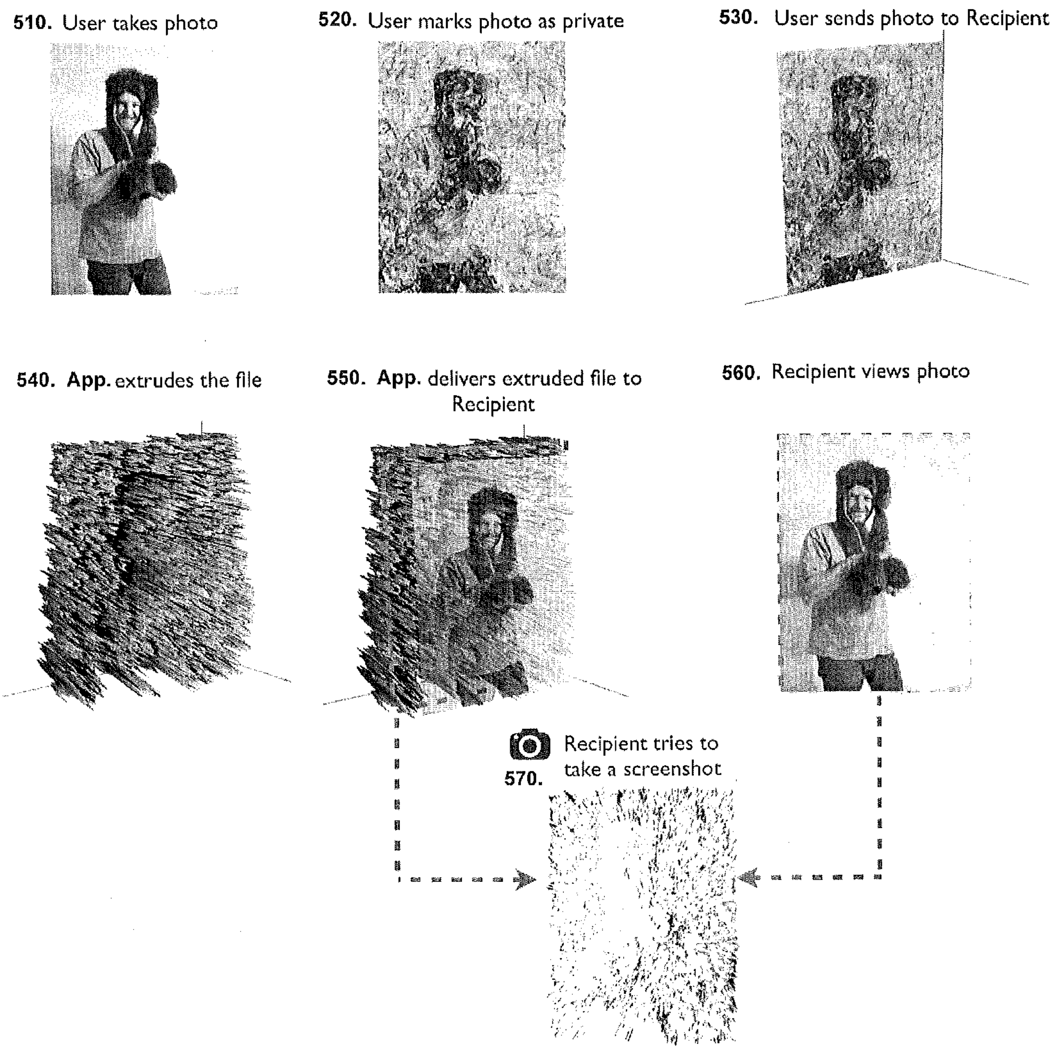
FIG. 5 is a diagram illustrating an example of using operations according to various embodiments described herein to reduce/prevent screenshotting of a received photo.

Referring now to FIG. 5, a diagram is provided illustrating an example of using operations according to various embodiments described herein to reduce/prevent screenshotting of a received photo. For example, FIG. 5 illustrates that a user of a first electronic device may take a photo (Operation 510). The user of the first electronic device may then indicate the photo as private (Operation 520) before sending the photo to a recipient who is using a second electronic device (Operation 530). An electronic application (e.g., a messaging application) of the first electronic device may extrude (e.g., break up into subsets)(Operation 540) the photo and deliver (Operation 550) the extruded photo to the recipient who is using the second electronic device. Upon receiving the extruded photo, the recipient using the second electronic device may view (Operation 560) the photo and/or attempt (Operation 570) to take a screenshot of the photo. The extruded photo, however, may be simulated to the recipient using the simulation operations illustrated in any of FIGS. 1-2B and 4. Accordingly, when the recipient attempts to take a screenshot in Operation 570, the screenshot will capture a garbled image (as illustrated in Operation 570 of FIG. 5) rather than capturing the complete photo.

Figure 6:
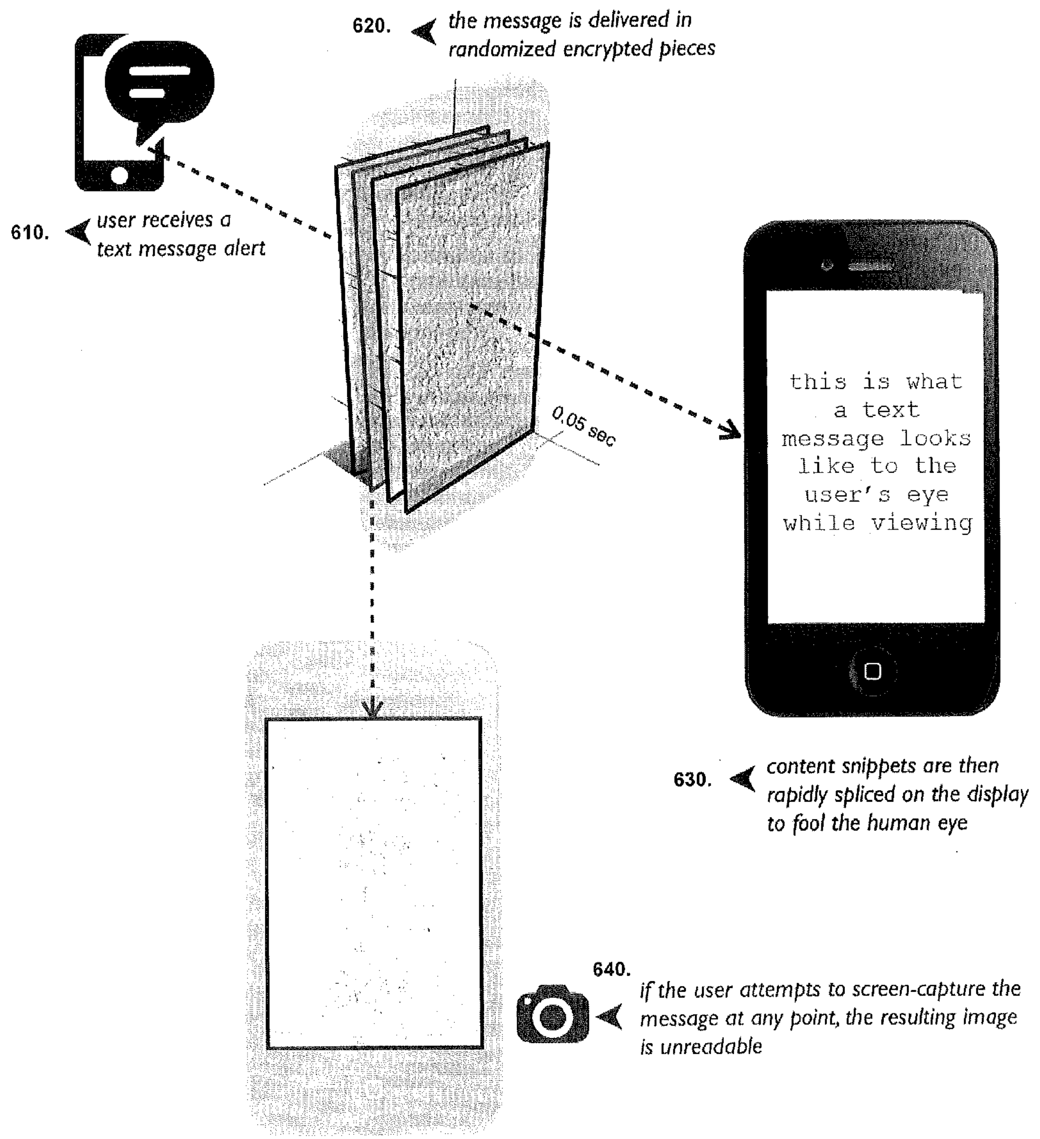
FIG. 6 is a diagram illustrating an example of using operations according to various embodiments described herein to reduce/prevent screenshotting of a received text message.

Referring now to FIG. 6, a diagram is provided illustrating an example of using operations according to various embodiments described herein to reduce/prevent screenshotting of a received text message. For example, FIG. 6 illustrates that a user of an electronic device may receive a text message alert (Operation 610). In particular, various embodiments described herein may use an electronic application (e.g., a messaging application) capable of transmitting text, images, documents, and emails. For example, the electronic application may transmit such content using secure encrypted channels. Moreover, the electronic application may include functionality present in messaging applications such as BBM, Apple Inc.'s iMessage, WhatsApp Inc.'s WhatsApp Messenger, and the like. It will be understood that a sender and a recipient of a message may be using respective copies/instances of an electronic application according to various embodiments described herein, and that the sender's copy/instance of the electronic application may deliver the message to the recipient in pieces/subsets.

As illustrated in Operation 620 of FIG. 6, the text message may be delivered to the recipient in randomized, encrypted pieces. In particular, any message and/or content delivered by an application according to various embodiments described herein may be encrypted in randomized pieces, and the content may never be completely decrypted because a recipient's electronic application may only simulate the content.

For example, content snippets may be rapidly spliced (e.g., spliced in fractions of a second) on the display screen of the recipient's electronic device such that the human eye thinks it is perceiving the complete content (Operation 630). As an example, operations in any of FIGS. 1A-1C may be used to effectively stream the randomized pieces of content to the display screen at a high frequency. To provide an analogy, this may be conceptually similar to video frames, but where each frame includes a piece of the original content. Accordingly, when the frames are played back at a high frame rate, the human eye may be fooled into thinking that it is viewing a static image.

As illustrated in Operation 640 of FIG. 6, a recipient attempting to screenshot the text message may only capture an unreadable image (rather than the received text "this is what a text message looks like to the user's eye while viewing"). Specifically, if at any point in time during the simulation of the text message (or other visual content) on the recipient's display screen, the recipient attempts to capture the content that is on the display screen, the resulting captured image may merely be the encrypted, randomized slice (e.g., piece/subset) of the content that is displayed at the particular point in time of capture. In particular, the captured image may be incomplete/unreadable because the content on the display screen may be simulated to the recipient using the simulation operations illustrated in any of FIGS. 1-2B and 4.

Figure 7:
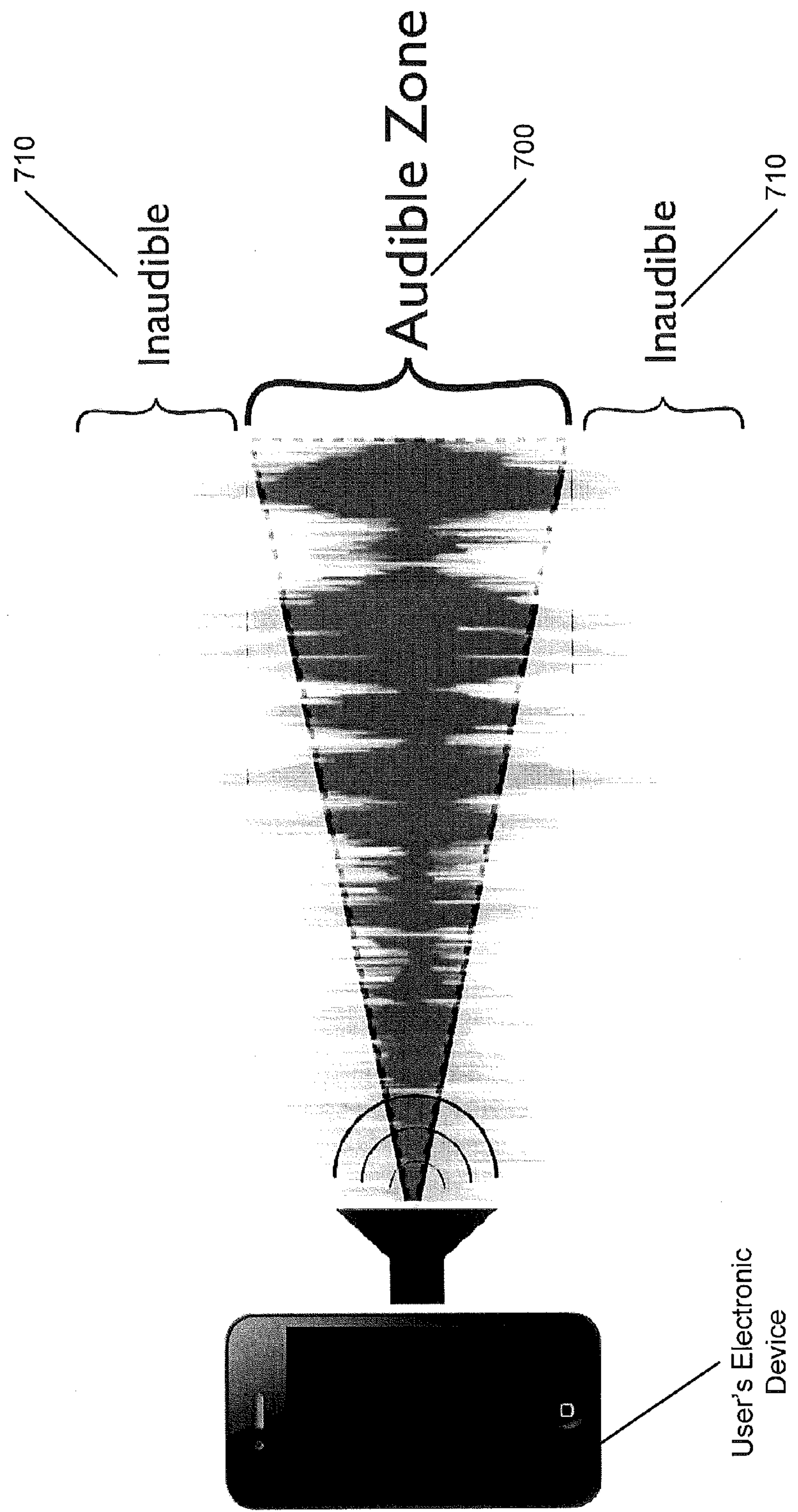
FIG. 7 is a diagram illustrating audible and inaudible zones of sound that can be produced by a speaker of a user's electronic device.

Referring now to FIG. 7, a diagram is provided illustrating audible and inaudible zones of sound that can be produced by a speaker of a user's electronic device. In particular, in some embodiments, one or more of the viewing conditions described herein must be met for the user's electronic device to produce sound in an audible zone 700 that is understandable to a human ear. For example, when the user's electronic device receives a message including audio content, an electronic application according to various embodiments described herein may dictate that the audio content of the message may only be understandable to a human ear if one or more viewing conditions are met. If the one or more viewing conditions are not met, then the audio content may either not be produced at all by the speaker of the user's electronic device or may otherwise be produced in an inaudible 710 form. For example, it will be understood that the operations illustrated in the flowchart of FIG. 3 may be used to deliver digital visual content and/or digital audio content.

Figure 8:
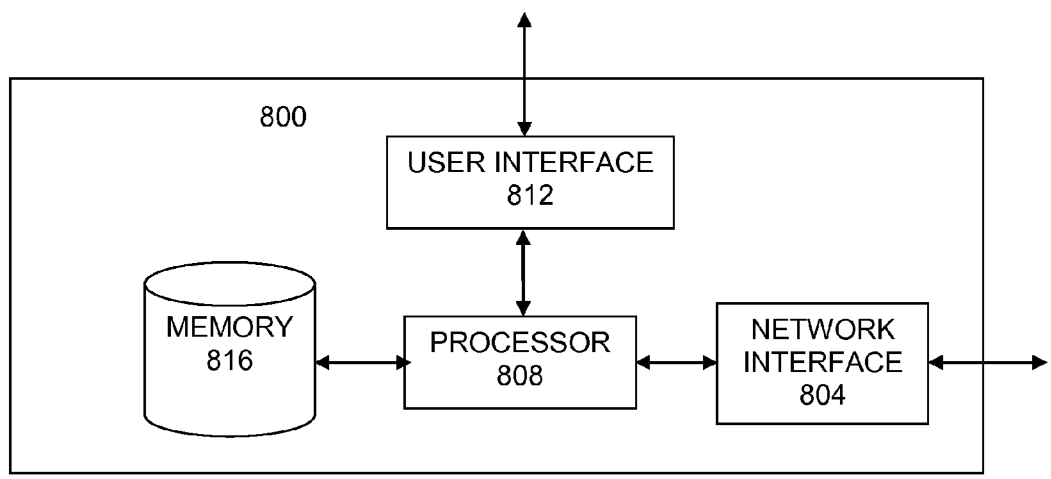
FIG. 8 is a block diagram of an exemplary apparatus in accord with the present invention.

FIG. 8 presents an example of a device in accord with the present invention. The device 800 may take the form of a desktop computer, portable computer, smartphone, tablet, or other electronic device. The device 800 typically includes, at least, a network interface 804, a processor 808, a user interface 812, and a memory 816.

As discussed above, the network interface 804 allows the device 800 to receive communications containing information corresponding to digital content, such as videos, photos, text, SMS or MMS messages, etc. Suitable network interfaces 804 include gigabit Ethernet, Wi-Fi (802.11a/b/g/n), and 3G/4G wireless interfaces such as GSM/WCDMA/LTE that enable data transmissions between device 800 and other devices.

The processor 808 takes the communications received through the network interface 804 and processes them for simulated display in accord with the methods and processes discussed above. A typical processor 808 is an x86, x86-64, or ARMv7 processor, and the like.

The user interface 812 allows the device 800 to display simulated digital content to a user. Exemplary user interfaces 812 include liquid crystal displays (LCDs), cathode ray tubes (CRTs), light-emitting diode (LED) displays, etc. of various forms and sizes; often integrated with the device 800, although sometimes separate therefrom.

The memory 816 provides both transient and persistent storage for data received via the network interface 804, data processed by the processor 808, and data sent via the user interface 812. Suitable memories 816 random access memory (RAM), disk-based storage, non-volatile semiconductor memory implementations, etc.

In some embodiments described herein, the possibility of private and/or confidential content becoming compromised may be addressed by using ephemeral messaging (e.g., temporary simulations), chaotic frequency modulation, and/or high-level encryption. Several examples of scenarios in which content might be compromised in the absence of the inventive concepts are described herein.

For example, an unintended viewer/recipient may attempt to view content, either intentionally or by casual eavesdropping. Some embodiments described herein, however, may address this risk by determining/requiring that various viewing conditions are met, to ensure that only the owner (and/or intended recipient) of the content is able to see it. These conditions include, but are not limited to, facial recognition, ambient-light detection, geo-location, probabilistic gyroscopic information (e.g., information that 90% of the time a user holds a device at an angle within a specific range), etc. Example scenarios could be as follows:

1) A user leaves his phone on his desk while stepping away momentarily. He then receives a message at an application, which results in an alert indication at his phone. His co-worker, curious to see what the message is, picks up the phone to view the message. Although the co-worker may open/operate an application that would otherwise allow the co-worker to view the message, a forward-facing camera of the phone may enable facial recognition, and viewing of the message may be disabled after determining that the co-worker is not the owner of the phone.
2) A user receives a message in a crowded environment. When she opens the message to view its contents, the phone is jokingly snatched from her hand. The message's privacy settings have been set to high, and the messaging application, using accelerometer and gyroscopic information to detect a sudden movement, immediately disables viewing of the message.

In another example, an adversarial recipient may attempt to view displayable content. An adversarial recipient may be someone who is, or once was, thought to be a trusted party to confidential information, and who subsequently attempts to disseminate the information/content. Some embodiments herein may address this risk by rendering the displayed content in such a manner as to be difficult, if not impossible, to capture in a permanent record. Moreover, all content, whether text, audio, image, or video, may be encrypted and delivered to the recipient's display device only in part(s), and only the recipient's device may be capable of re-ordering the content into a coherent form. If an adversarial recipient attempts to screen-capture the device, the only information captured may be a randomized and/or encrypted snippet of the original content.

Content capture can occur in various forms, such as screenshots and the use of external cameras/recording devices. Screenshotting, common with modern electronic devices, is the act of using an electronic device to capture a single instant of the displayed content on the electronic device itself. Some embodiments herein, however, may address the risk of screenshotting by rendering any and every single instant of displayed content as a randomized, possibly encrypted, pixelated image. Moreover, although a third party may attempt to use an external camera/recording device to take a picture or video of the electronic device displaying the displayable content, some embodiments herein may protect against this risk by rendering the display screen of the electronic device unreadable/unviewable in response to viewing conditions (e.g., conditions agreed to by the sender and/or recipient of the content) that may detect the presence of such external devices.

In yet another example, a formerly trusted intended recipient may no longer be trustworthy. This type of recipient is one who, for example, may be part of a group, organization, or corporation and subscribes to, or is otherwise regularly sent, content provided by the parent entity. An example of this is an employee receiving corporate emails. If the employee is terminated, the corporation may elect to remove access to corporate accounts. Some embodiments herein may enable the corporation to not only restrict access to future emails, but, because the actual content served to the employee may only be simulated and never transmitted in whole, restrict access to past emails as well.

In a further example, a breach of security may occur with respect to an electronic device. For example, if an electronic device that receives a message is lost or stolen, it may be beneficial to protect against multiple forms of breach, including breach with respect to incoming content that may be inadvertently readable to the now-adversarial electronic device, as well as breach with respect to access to past content that may be "hackable" from the hardware of the electronic device. Some embodiments herein may disable visibility of protected content in both of these example breach scenarios. First, by establishing viewing conditions, the electronic device may only render the simulated content if all viewing conditions are met. For example, a combination of facial recognition and fingerprint presence may be used to meet the viewing conditions. An adversarial user of the electronic device would not meet these requirements. Secondly, in the event of hardware intrusion of the electronic device, content may still be protected because original content may not be transmitted to the device. Rather, encrypted/randomized "streams," which, when coupled with keys presented/required by viewing conditions, may be used to simulate the content in human-detectable form.

In the specification, various embodiments of the inventive concepts have been disclosed and, although specific terms are employed, they are used in a generic and descriptive sense only and not for purposes of limitation. Those skilled in the art will readily appreciate that many modifications are possible for the disclosed embodiments without materially departing from the teachings and advantages of the inventive concepts. The inventive concepts are defined by the following claims, with equivalents of the claims to be included therein.

What is claimed is:

1. A method of providing digital content, the method comprising:

providing information corresponding to displayable content, at an electronic device;

determining whether one or more viewing conditions are met with respect to the electronic device; and displaying the displayable content at the electronic device, in response to determining that the one or more viewing conditions are met with respect to the electronic device wherein displaying the displayable content comprises:

creating at least two portions of the displayable content, each portion constituting a subset of the displayable content; and displaying the at least two portions over at least two time periods, wherein only one portion of the displayable content is displayed per time period, wherein the time period durations are selected such that the display of the portions of the displayable content is perceived by a viewer as the display of the displayable content in its entirety.

2. The method of claim 1, further comprising:

continuing to determine whether the one or more viewing conditions are met, after beginning displaying the displayable content at the electronic device; and discontinuing displaying the displayable content at the electronic device in response to determining that the one or more viewing conditions are no longer met with respect to the electronic device.

3. The method of claim 1, further comprising measuring the one or more viewing conditions using a sensor of the electronic device.

4. The method of claim 3, wherein measuring the one or more viewing conditions comprises measuring the one or more viewing conditions using a camera, a light sensor, a position sensor, and/or a motion sensor of the electronic device.

5. The method of claim 1, wherein the one or more viewing conditions comprise a verification of a security key of the electronic device.

6. The method of claim 1, wherein determining whether the one or more viewing conditions are met with respect to the electronic device comprises:

determining that a display screen of the electronic device is unlikely to be visible to a third party.

7. The method of claim 1, further comprising decrypting the information before displaying the displayable content.

8. The method of claim 1, wherein providing the information corresponding to the displayable content comprises:

providing the information corresponding to the displayable content along with information regarding the one or more viewing conditions.

9. The method of claim 8, wherein determining whether the one or more viewing conditions are met with respect to the electronic device comprises:

using the information regarding the one or more viewing conditions when determining whether the one or more viewing conditions are met with respect to the electronic device.

10. The method of claim 1, wherein:

the electronic device comprises a first electronic device; and providing the information comprises transmitting the information from a second electronic device to the first electronic device.

11. The method of claim 10, wherein:

the first and second electronic devices comprise first and second peer devices, respectively, in a peer-to-peer network; and transmitting the information comprises transmitting the information from the second peer device to the first peer device.

12. The method of claim 10, wherein:

the first and second electronic devices comprise client and server devices, respectively, in a client-server network; and transmitting the information comprises transmitting the information from the server device to the client device.

13. The method of claim 1, wherein providing the information comprises generating the information at the electronic device without using a network connection.

14. The method of claim 1, wherein determining whether the one or more viewing conditions are met with respect to the electronic device comprises:

determining whether a physical privacy screen is used with the electronic device.

* * * * *